(12) United States Patent
Tachibana et al.

(10) Patent No.: US 7,856,958 B2
(45) Date of Patent: Dec. 28, 2010

(54) PISTON FOR INTERNAL COMBUSTION ENGINE, AND INTERNAL COMBUSTION ENGINE USING THE PISTON

(75) Inventors: Ryoji Tachibana, Toyota (JP); Mitsumasa Yamagata, Toyota (JP); Tomihisa Tsuchiya, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/524,915

(22) PCT Filed: Jan. 28, 2008

(86) PCT No.: PCT/IB2008/000543

§ 371 (c)(1),
(2), (4) Date: Jul. 29, 2009

(87) PCT Pub. No.: WO2008/093240

PCT Pub. Date: Aug. 7, 2008

(65) Prior Publication Data

US 2010/0059016 A1    Mar. 11, 2010

(30) Foreign Application Priority Data

Jan. 29, 2007    (JP) .............................. 2007-017570

(51) Int. Cl.
*F02F 3/28* (2006.01)
(52) U.S. Cl. ..................................... 123/307
(58) Field of Classification Search ................. 123/262, 123/263, 269, 279, 285, 301, 307, 193.6, 123/661, 671
See application file for complete search history.

(56) References Cited

U.S. PATENT DOCUMENTS

| 4,770,139 | A | 9/1988 | Tanaka |
| 5,551,392 | A | 9/1996 | Yamaji et al. |
| 6,129,066 | A | 10/2000 | Umierski |
| 6,725,828 | B1 | 4/2004 | Han et al. |
| 6,971,379 | B2 * | 12/2005 | Sakai et al. .................. 123/661 |
| 7,341,053 | B2 * | 3/2008 | Kitada et al. ................. 123/661 |
| 7,681,564 | B2 * | 3/2010 | Umierski et al. ............. 123/661 |
| 2002/0014219 | A1 | 2/2002 | Suzuki et al. |
| 2004/0123855 | A1 * | 7/2004 | Yonekawa et al. .......... 123/661 |

FOREIGN PATENT DOCUMENTS

| EP | 0 851 102 A2 | 7/1998 |
| EP | 1 191 200 A1 | 3/2002 |
| JP | 07-119472 A | 5/1995 |
| JP | 07-166866 A | 6/1995 |
| JP | 09-105330 A | 4/1997 |
| JP | 10-008968 A | 1/1998 |
| JP | 10-331642 A | 12/1998 |
| JP | 11-218026 A | 8/1999 |

(Continued)

*Primary Examiner*—Hai H Huynh
(74) *Attorney, Agent, or Firm*—Sughrue Mion, PLLC

(57) ABSTRACT

A piston top surface (23) has a depression. A center region (28A) is formed at the center of the depression to secure the diameter of a center tumble flow to be large. A side region (28B) is formed on both sides of the piston top surface to generate a side tumble flow that is not influenced by a cylinder bore inner wall and has a flow line generally parallel to that of the center tumble flow.

15 Claims, 13 Drawing Sheets

FOREIGN PATENT DOCUMENTS

| | | |
|---|---|---|
| JP | 11-324679 A | 11/1999 |
| JP | 11-343851 A | 12/1999 |
| JP | 2000-087750 A | 3/2000 |
| JP | 2001-59422 * | 3/2001 |
| JP | 3721879 B2 | 11/2005 |
| JP | 3758364 B2 | 3/2006 |
| JP | 3835171 B2 | 10/2006 |
| JP | 2008-175133 A | 7/2008 |
| WO | 00/77361 A1 | 12/2000 |

* cited by examiner

RELATED ART

RELATED ART

PISTON FOR INTERNAL COMBUSTION ENGINE, AND INTERNAL COMBUSTION ENGINE USING THE PISTON

BACKGROUND OF THE INVENTION

1. Field of the Invention

The present invention relates to a piston for an internal combustion engine for an automobile or the like, and also to an internal combustion engine to which the piston is applied. More particularly, the present invention relates to an improvement in the shape of a depression formed in the top surface of a piston to maintain a tumble flow of intake air inside a cylinder.

2. Description of the Related Art

In conventional internal combustion engines (hereinafter occasionally referred simply to as "engines") in which an air-fuel mixture is combusted in a combustion chamber to generate power, a tumble flow (vertical vortex flow) generated in a cylinder is effectively utilized to increase the combustion efficiency of fuel, and thus improves the output, the exhaust emission, the fuel consumption rate, and so forth. That is, the tumble flow agitates inside the cylinder to promote evaporation and atomization of fuel, achieving an excellent fuel property of fuel in the combustion chamber.

Various configurations have been proposed so far to positively generate such a tumble flow. For example, Japanese Patent Application Publications Nos. 9-105330 and 11-218026 (JP-A-9-105330 and JP-A-11-218026) disclose forming an intake port as a tumble port. That is, the flow line of intake air flowing into a cylinder is set closer to the vertical direction by setting the axis of the intake port closer to the vertical direction at a portion where it opens into the cylinder, allowing to obtain a large tumble flow.

Japanese Patent Application Publication No. 7-119472 (JP-A-7-119472) and

WO 00/77361 disclose providing a tumble control valve in an intake passage, which opens and closes to generate a large tumble flow in a cylinder as necessary. Specifically, the intake passage is partitioned by a separation wall (partition plate) into two, upper and lower flow paths, and a tumble control valve for opening and closing the lower flow path is provided. When it is necessary to generate a large tumble flow in the cylinder (for example when the engine is cold), the tumble control valve is closed and intake air is sent from only the upper flow path, so that the flow line of intake air flowing into the cylinder is set to a direction closer to the vertical direction, allowing to obtain a large tumble flow.

The engines in which means for positively generating a tumble flow such as described above is implemented adopt a piston formed with a depression for maintaining the tumble flow in its top surface (piston crown). For example, JP-A-9-105330 discloses forming a depression with a large length (the dimension in the direction along the tumble flow axis (the center line of a vortex flow)) in a region facing an exhaust valve, and forming a depression with a small length in a region facing an intake valve. JP-A-11-218026 discloses forming a circular bowl-shaped depression in the piston top surface. JP-A-7-119472 discloses forming a depression of which outer peripheral shape in the direction along the tumble flow axis is generally arcuate, and of which outer peripheral shape in the direction perpendicular to the tumble flow axis is straight, as viewed in plan. WO 00/77361 discloses forming in a piston top surface a depression which is generally rectangular or generally trapezoidal as viewed in plan. By forming such depressions in the piston top surface, a tumble flow is guided by the piston top surface to maintain the tumble flow.

The inventors of the present invention have found that the conventional depression shapes cannot achieve an optimum tumble flow, and thus have studied on the shape of a depression to be formed in the piston top surface. They also have considered the shape of a piston top surface more suitable to generate an effective tumble flow. A detailed description is as follows.

In the case where a depression is formed in a piston top surface to maintain a tumble flow, the tumble flow flows along the shape of the depression (the shape of the surface of a curved depression). Therefore, the outside diameter of the tumble flow is determined generally according to the width of the depression (the dimension in the direction perpendicular to the tumble flow axis (the center line of a vortex flow): the dimension in the direction in which an intake valve and an exhaust valve face each other).

A part of the tumble flow generated in the central region in the axial direction of the tumble flow (a part of the tumble flow generated at the center of the piston top surface, which is hereinafter referred to as "center tumble flow") flows in a region where the depression width is large, and therefore is hardly influenced by a cylinder bore inner wall but flows along the shape of the depression. Therefore, a tumble flow with a relatively large outside diameter is generated in the central region in the axial direction of the tumble flow by setting the depression width larger. For example, in JP-A-11-218026 and JP-A-7-119472, a large tumble flow is generated in the central region in the axial direction of the tumble flow by forming the outer peripheral shape of the depression as viewed in plan with curved lines.

On the other hand, a part of the tumble flow generated in both outer areas in the axial direction (on both sides of the axis) of the tumble flow (a tumble flow generated at both ends of the piston top surface, which is hereinafter referred to as "side tumble flow") is significantly influenced by the cylinder bore inner wall existing adjacently in the axial direction of the tumble flow. The side tumble flow influenced by the cylinder bore inner wall includes a flow in the direction perpendicular to the tumble flow axis (a flow generally parallel to the flow line of the center tumble flow) and a flow toward the center side of the piston top surface due to the influence of the cylinder bore inner wall.

FIG. 12 is a plan view of a piston top surface having a depression "a" of a typical shape, in which the directions of the center tumble flow and the side tumble flow flowing in the vicinity of the surface of the depression are indicated by the arrows. In the drawing, "SE" represents a center tumble flow. "SA1" and "SA2" represent a side tumble flow, with "SA1" indicating a flow in the direction perpendicular to the tumble flow axis and "SA2" indicating a flow toward the center side of the piston top surface due to the influence of the cylinder bore inner wall. Also in FIG. 12, "b" indicates the position of an intake valve, while "c" indicates the position of an exhaust valve, respectively.

The energy given to the air (or air-fuel mixture) flowing into the cylinder from the intake port is evenly determined according to the cylinder bore diameter, the piston moving speed, and so forth. That is, the fluid energy of the entire tumble flow is even. Therefore, an effective tumble flow is generated by utilizing the entirety of the given energy to create a flow in the direction perpendicular to the tumble flow axis without a loss.

However, some of the given energy is consumed to create a flow toward the center side of the piston top surface, with the tumble flow actually generated, in particular the side tumble flow, influenced by the cylinder bore inner wall as described above (see the side tumble flow SA2 in FIG. 12). That is, a part of the energy is consumed to create a flow other than in the direction perpendicular to the axis of the tumble flow.

Thus, in the case where such a flow toward the center side of the piston top surface is created, a sufficient flow in the direction perpendicular to the axis of the tumble flow cannot be obtained. In addition, the tumble flow toward the center side of the piston top surface and the center tumble flow interfere with each other, which wastefully consumes the fluid energy of the center tumble flow.

In order to prevent generation of such a flow toward the center side of the piston top surface, other configurations are conceivable in which a depression in a piston top surface is not formed in the vicinity of the cylinder bore inner wall. An example of such configurations is shown in FIG. 13 (a plan view of a piston top surface).

With such a configuration, however, agitation cannot be performed in the cylinder in both outer areas in the axial direction of the tumble flow (regions "d" hatched in FIG. 13), making it difficult to promote sufficient evaporation and atomization of fuel.

SUMMARY OF THE INVENTION

The inventors of the present invention have found that the phenomenon described above (that the energy of a side tumble flow is consumed to create a flow toward the center side of a piston top surface) actually occurs in a cylinder, and have focused on the possibility that the combustion efficiency by a tumble flow can be significantly increased by restricting generation of a tumble flow toward the center side of the piston top surface. The inventors of the present invention also have considered the possibility of sufficiently agitating intake air in both outer areas in the axial direction of the tumble flow to sufficiently promote evaporation and atomization of fuel in the entire cylinder.

The present invention provides a piston with a depression for maintaining a tumble flow formed in its top surface, in which the depression has such a shape that can utilize most of the fluid energy given to intake air to generate a tumble flow which flows in the direction perpendicular to the tumble flow axis, and that can promote evaporation and atomization of fuel generally in the entire cylinder. The present invention also provides an internal combustion engine using the piston.

That is, the depression for maintaining a tumble flow formed in the piston top surface includes a part which functions to secure the diameter of a tumble flow (center tumble flow) to be large at the center of the piston top surface, and a part which functions to generate a tumble flow (side tumble flow) that is not influenced by the cylinder bore inner wall and that is generally parallel to the direction of the flow line of the center tumble flow on both sides of the piston top surface.

A first aspect of the present invention provides a piston for an internal combustion engine including a top surface having a depression. The depression includes a center region formed at a center in a direction along a tumble flow axis and a side region continuously formed on both outer sides of the center region in the direction along the tumble flow axis. The center region has a reduction part in which a dimension of the center region in a width direction perpendicular to the tumble flow axis is gradually reduced toward a piston outer periphery in the direction along the tumble flow axis. The side region has a constant part extending generally in parallel to the tumble flow axis.

According to this configuration, intake air flowing into the cylinder generates a tumble flow including a center tumble flow flowing along the "center region" and a side tumble flow flowing along the "side region."

At the center of the "center region" in the direction along the tumble flow axis, the depression width is secured to be relatively large, so that a center tumble flow having a large diameter and a flow line extending in the direction perpendicular to the tumble flow axis is generated. In addition, in the "reduction part" of the "center region," the depression width is gradually reduced toward the piston outer periphery in the direction along the tumble flow axis, so that the diameter of the tumble flow becomes gradually smaller toward the piston outer periphery. That is, the diameter of the tumble flow becomes gradually smaller as the in-cylinder length (the length of the space inside the cylinder) in the direction perpendicular to the tumble flow axis becomes gradually smaller toward the piston outer periphery, so as to generate an ideal center tumble flow (that is not influenced by the cylinder bore inner wall) with its flow line extending in the direction perpendicular to the tumble flow axis and not disturbed. The "reduction part" also contributes to increasing the compression ratio in the combustion chamber.

On the other hand, the "side region" has a "constant part" extending generally in parallel to the tumble flow axis. The diameter of the side tumble flow which flows in the "side region" does not become smaller toward the piston outer periphery, but is generally uniform over the entire "side region." That is, a side tumble flow with a generally uniform outside diameter smaller than that of the center tumble flow is generated in the "side region." Thus, a side tumble flow hardly influenced by the cylinder bore inner wall adjacent in the direction of the tumble flow axis is generated in the vicinity of the outer periphery of the piston top surface, generating a tumble flow having a flow line extending in the direction perpendicular to the tumble flow axis. As a result, it is possible to promote evaporation and atomization of fuel in the entire cylinder.

As described above, according to the first aspect of the present invention, it is possible to utilize most of the fluid energy given to intake air to generate a tumble flow which flows in the direction perpendicular to the tumble flow axis, and to promote evaporation and atomization of fuel in the entire cylinder.

A second aspect of the present invention provides a piston for an internal combustion engine including: a top surface having a depression for maintaining a tumble flow; and an outer peripheral part having a piston pin hole through which a piston pin is to be inserted. The depression includes a center region formed at a center in a direction along an axis of the piston pin hole and a side region continuously formed on both outer sides of the center region in the direction along the axis of the piston pin hole. The center region has a reduction part in which a dimension of the center region in a width direction perpendicular to the axis of the piston pin hole is gradually reduced toward a piston outer periphery in the direction along the axis of the piston pin hole. The side region has a constant part extending generally in parallel to the axis of the piston pin hole.

Also according to this configuration, the same effect as that of the first aspect can be obtained. That is, it is possible to utilize most of the fluid energy given to intake air to generate a tumble flow which flows in the direction perpendicular to the tumble flow axis (which extends in parallel to the axis of the piston pin hole), and to promote evaporation and atomization of fuel in the entire cylinder.

Further, a third aspect of the present invention provides a piston for an internal combustion engine including a top surface having a depression. An edge line defining an outer periphery of the depression includes a changing edge line along which a dimension of the depression in a width direction perpendicular to a tumble flow axis becomes smaller from a center in a direction along the tumble flow axis toward a piston outer periphery in the direction along the tumble flow axis, and a constant edge line along which the dimension of the depression in the width direction is maintained to be generally constant toward the piston outer periphery in the direction along the tumble flow axis. The changing edge line and the constant edge line are continuously formed with an inflection part provided therebetween.

The piston may further include an outer peripheral part having a piston pin hole through which a piston pin is to be inserted, and an edge line defining an outer periphery of the depression includes a changing edge line along which a dimension of the depression in a width direction perpendicular to an axis of the piston pin hole becomes smaller from a center in a direction along the axis of the piston pin hole toward a piston outer periphery in the direction along the axis of the piston pin hole, and a constant edge line along which the dimension of the depression in the width direction is maintained to be generally constant toward the piston outer periphery in the direction along the axis of the piston pin hole. The changing edge line and the constant edge line are continuously formed with an inflection part provided therebetween.

According to these configurations, a center tumble flow is generated on the center side with respect to the "inflection part," while a side tumble flow is generated on the outer side with respect to the "inflection part." The functions of the center tumble flow and the side tumble flow are the same as those in the aspects described above. Thus, also according to the third aspect, it is possible to utilize most of the fluid energy given to intake air to generate a tumble flow which flows in the direction perpendicular to the tumble flow axis (axis of the piston pin hole), and to promote evaporation and atomization of fuel in the entire cylinder.

Still further, a fourth aspect of the present invention provides a piston for an internal combustion engine including: a top surface having a valve recess for avoiding interference with a valve and a depression. A region where the valve recess is formed and a region where the depression is formed are adjacent to each other. An edge line defined between the region where the valve recess is formed and the region where the depression is formed includes a changing edge line along which a dimension of the depression in a width direction perpendicular to a tumble flow axis becomes smaller from a center in a direction along the tumble flow axis toward a piston outer periphery in the direction along the tumble flow axis, a constant edge line along which the dimension of the depression in the width direction is maintained to be generally constant toward the piston outer periphery in the direction along the tumble flow axis, and an inflection part connecting the changing edge line and the constant edge line.

The piston may further include an outer peripheral part having a piston pin hole through which a piston pin is to be inserted, and an edge line defined between the region where the valve recess is formed and the region where the depression is formed includes a changing edge line along which a dimension of the depression in a width direction perpendicular to an axis of the piston pin hole becomes smaller from a center in a direction along the axis of the piston pin hole toward a piston outer periphery in the direction along the axis of the piston pin hole, a constant edge line along which the dimension of the depression in the width direction is maintained to be generally constant toward the piston outer periphery in the direction along the axis of the piston pin hole, and an inflection part connecting the changing edge line and the constant edge line.

Also according to these configurations, a center tumble flow is generated in a part of the depression defined by the "changing edge line" on the center side with respect to the "inflection part," while a side tumble flow is generated in a part of the depression defined by the "constant edge line" on the outer side with respect to the "inflection part." The functions of the center tumble flow and the side tumble flow are the same as those in the aspects described above. Thus, also according to this aspect, it is possible to utilize most of the fluid energy given to intake air to generate a tumble flow which flows in the direction perpendicular to the tumble flow axis, and to promote evaporation and atomization of fuel in the entire cylinder.

The fourth aspect is particularly effective in causing the center tumble flow and the side tumble flow to fulfill their functions in the piston in which the region where the valve recess is formed and the region where the depression is formed adjacent to (or overlap) each other.

The part of the depression where the dimension in the width direction is largest may be set as follows. Provided that the valve recess includes two intake-side valve recesses provided adjacent to each other and two exhaust-side valve recesses provided adjacent to each other, the dimension of the depression in the width direction perpendicular to the tumble flow axis is set to be largest in a region between an intermediate position between the intake-side valve recesses and an intermediate position between the exhaust-side valve recesses.

Likewise, the dimension of the depression in the width direction perpendicular to the axis of the piston pin hole is set to be largest in a region between an intermediate position between the intake-side valve recesses and an intermediate position between the exhaust-side valve recesses.

According to these configurations, it is possible to generate a tumble flow with the largest outside diameter at the center of the piston top surface, allowing a tumble flow of an ideal shape optimum for evaporation and atomization of fuel to be formed in the cylinder.

A fifth aspect of the present invention provides an internal combustion engine including: a cylinder having a cylinder bore; and the piston described above disposed in the cylinder bore. That is, any one of the pistons according to the first to fourth aspects described above is disposed in the cylinder bore. The piston reciprocates in the cylinder bore to generate power as an air-fuel mixture is combusted in a combustion chamber.

A sixth aspect of the present invention provides a piston for an internal combustion engine including a top surface having a depression. The depression includes a center region formed at a center in a longitudinal direction of the depression and a side region continuously formed on both outer sides of the center region in the longitudinal direction. The center region has a reduction part in which a dimension of the center region in a width direction perpendicular to the longitudinal direction is gradually reduced toward a piston outer periphery in the longitudinal direction. The side region has a constant part in which a dimension of the side region in the width direction is substantially uniform in the longitudinal direction.

According to the present invention, it is possible to utilize most of the fluid energy given to intake air to generate a tumble flow which flows in the direction perpendicular to the tumble flow axis (axis of the piston pin hole), to generate a tumble flow generally in the entire cylinder, and to promote evaporation and atomization of fuel in the entire cylinder. As a result, the combustion efficiency of fuel in the combustion chamber can be increased, and the exhaust emission and the fuel consumption rate can be improved.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

A description will hereinafter be made of an embodiment of the present invention with reference to the drawings. In this embodiment, a piston for use in multi-cylinder (for example, inline four-cylinder) gasoline engines for automobiles is described.

Figure 1:
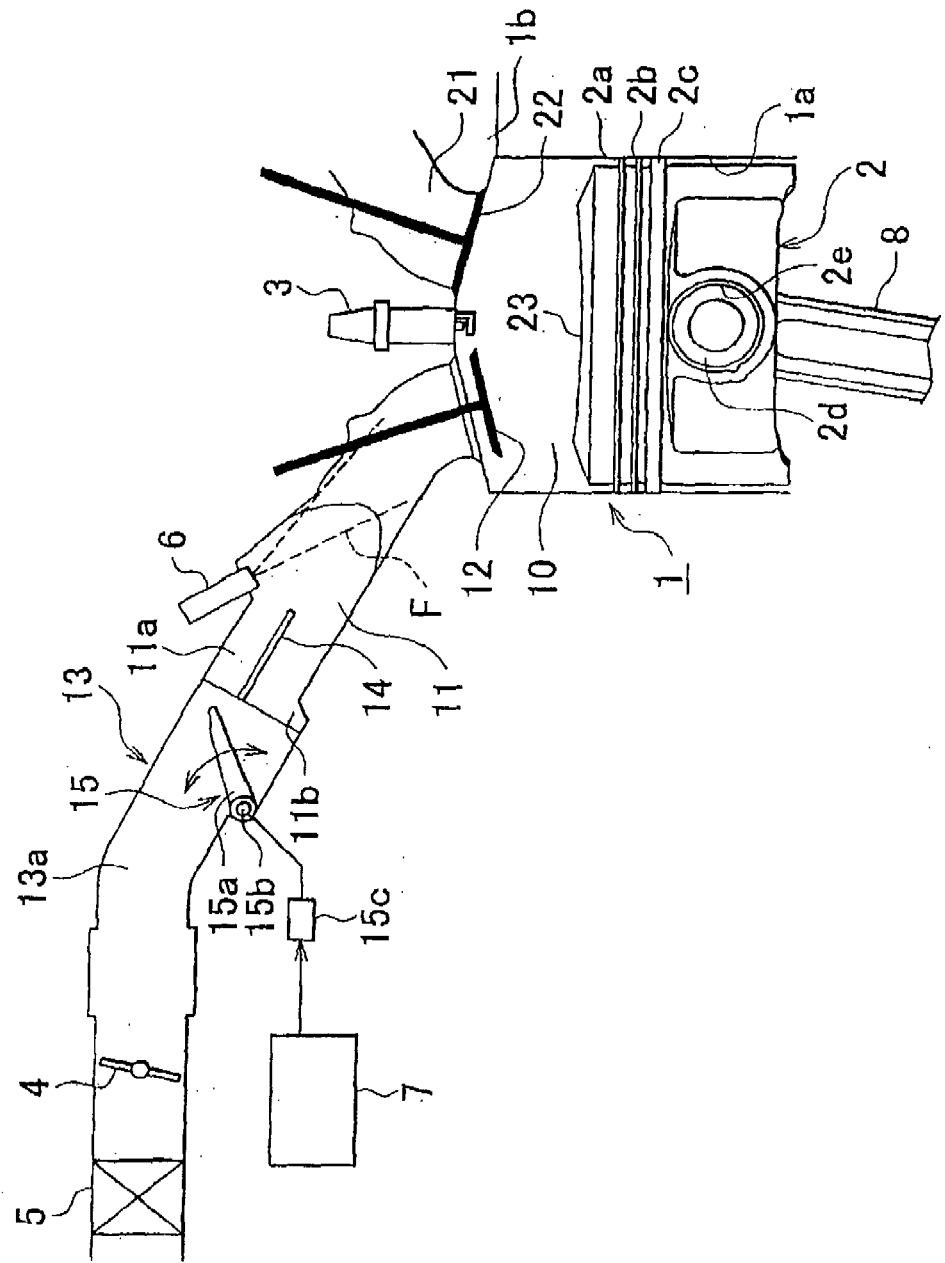
FIG. 1 is a sectional view showing the construction of a combustion chamber of an engine and its surrounding components in accordance with an embodiment of the present invention, showing the state where a tumble control valve is fully closed.

FIG. 1 is a sectional view showing the construction of a combustion chamber 10 of an engine (internal combustion engine) 1 and its surrounding components in accordance with this embodiment. As shown in FIG. 1, the engine 1 in accordance with this embodiment is a four-valve multi-cylinder gasoline engine including two intake valves 12 and two exhaust valves 22 for each cylinder. In FIG. 1, only one cylinder is shown, and only one intake valve 12 and one exhaust valve 22 are shown.

A piston 2 which can reciprocate vertically is provided in each cylinder 1a of the engine 1. The piston 2 is coupled to a crankshaft (not shown) via a connecting rod 8 so that reciprocating movement of the piston 2 is converted into rotation of the crankshaft by the connecting rod 8.

A cylinder head 1b is attached to the upper part of the cylinder 1a. The combustion chamber 10 is defined by the cylinder head 1b, the cylinder 1a (cylinder bore inner wall), and the piston 2. An ignition plug 3 is disposed at the upper part of the combustion chamber 10.

An intake port 11 and an exhaust port 21 formed in the cylinder head 1b are respectively connected to the combustion chamber 10 of the engine 1. The intake valve 12 is provided between the intake port 11 and the combustion chamber 10. Opening and closing the intake valve 12 allows and blocks communication between the intake port 11 and the combustion chamber 10. Also, the exhaust valve 22 is provided between the exhaust port 21 and the combustion chamber 10. Opening and closing the exhaust valve 22 allows and blocks communication between the exhaust port 21 and the combustion chamber 10. The intake valve 12 and the exhaust valve 22 are respectively opened and closed by rotation of an intake camshaft and an exhaust camshaft to which rotation of the crankshaft is transmitted.

An intake passage 13a formed in an intake manifold 13 is connected to the intake port 11. Also, an exhaust passage formed in an exhaust manifold (not shown) is connected to the exhaust port 21.

An air cleaner (with an airflow meter) 5 is provided upstream of the intake passage 13a. In addition, an electronically controlled throttle valve 4 for adjusting the intake air amount of the engine 1 and so forth are disposed in the intake passage 13a.

An injector 6 for fuel injection is disposed at the intake port 11. The injector 6 is supplied with fuel at a predetermined pressure from a fuel tank (not shown) by a fuel pump, and injects the fuel into the intake port 11. The injected fuel is mixed with intake air to form an air-fuel mixture, which is inducted into the combustion chamber 10 of the engine 1. The air-fuel mixture inducted into the combustion chamber 10 is compressed in the compression stroke of the engine 1, and then is ignited by the ignition plug 3 to burn (expansion stroke). The combustion of the air-fuel mixture in the combustion chamber 10 reciprocates the piston 2, which rotates the crankshaft as an output shaft.

The operation state of the engine 1 described above is controlled by an ECU (electronic control unit) 7. The ECU 7 includes a CPU, a ROM, a RAM, a backup RAM, and so forth (not shown). The ROM stores various control programs, maps to be referenced when executing these control programs, and other data. The CPU executes various operations based on the control programs and the maps stored in the ROM. The RAM is a memory for temporarily storing the results of the operations in the CPU and data input from respective sensors. The backup RAM is a nonvolatile memory for storing data to be saved, for example when the engine 1 is stopped.

The ECU 7 performs various control of the engine 1 by controlling various components such as the injector 6, an igniter of the ignition plug 3, and a throttle motor of the throttle valve 4 based on outputs from various sensors (not shown) such as a water temperature sensor, an airflow meter, an intake air temperature sensor, a throttle position sensor, a crank position sensor (engine speed sensor), a cam position sensor, and an accelerator position sensor. The ECU 7 further controls a tumble control valve 15 to be described later.

A description is now made of the intake system in which a tumble flow in the cylinder is adjusted by controlling the tumble control valve 15.

As shown in FIG. 1, a partition wall 14 having a predetermined length and extending along the longitudinal direction of the intake port 11 (the direction of an intake air flow) is provided in the intake port 11. The partition wall 14 and the tumble control valve 15 constitute a tumble control mechanism for controlling a tumble flow. The partition wall 14 is disposed so as not to interfere with fuel spray F injected from the injector 6.

The partition wall 14 divides a part of the space inside the intake port 11 into two, upper and lower portions to form an upper flow path 11a and a lower flow path 11b at the entrance of the intake port 11. The tumble control valve 15 is provided upstream of the two, upper and lower flow paths 11a, 11b. The tumble control valve 15 is disposed in the intake manifold 13 connected upstream of the intake port 11.

The tumble control valve 15 includes a plate-like valve element 15a and a rotary shaft 15b supporting an end of the valve element 15a. An actuator 15c such as a motor is coupled to the rotary shaft 15b. When the actuator 15c is driven, the opening of the valve element 15a, that is, the opening of the tumble control valve 15, is adjusted.

Figure 2:
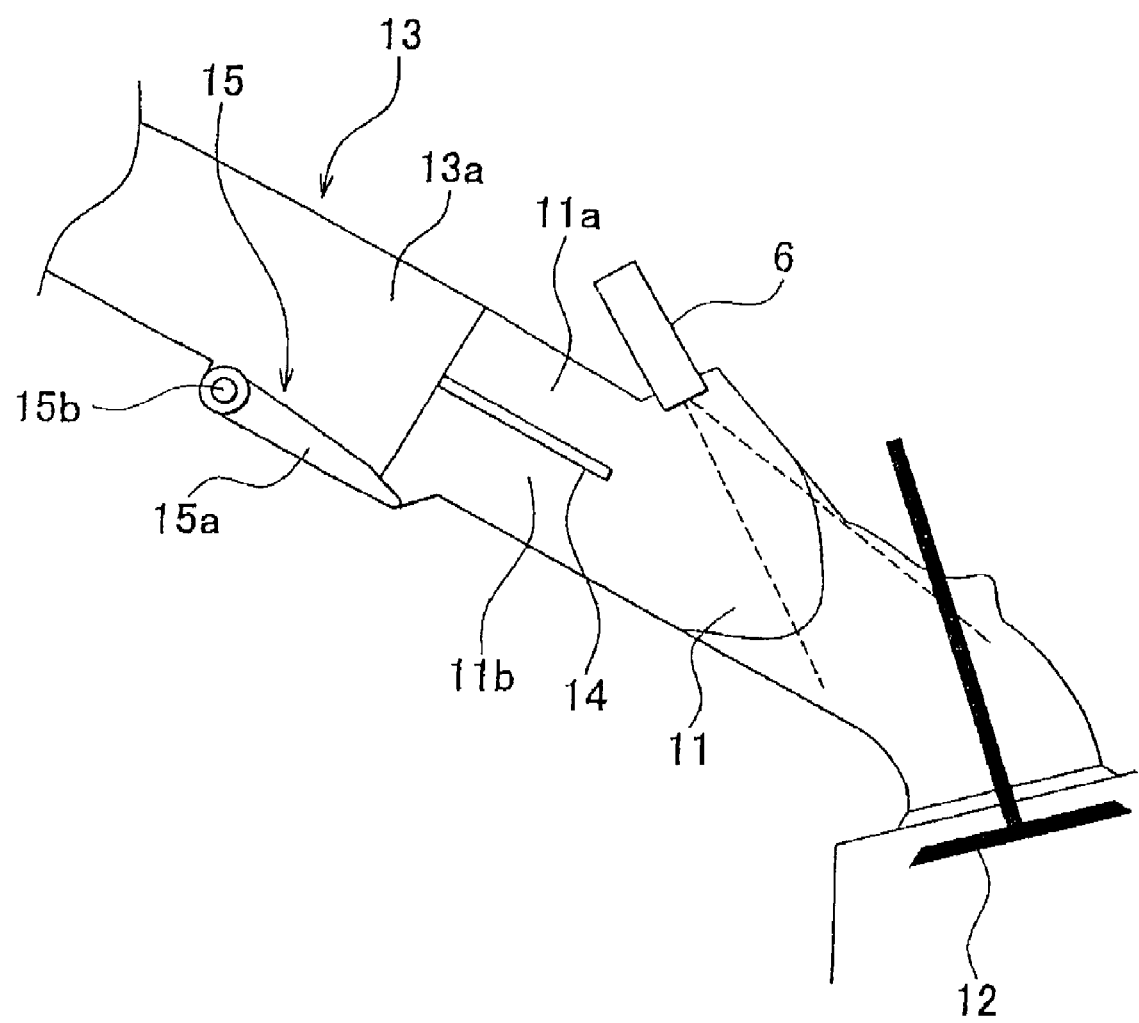
FIG. 2 shows the schematic construction of an intake system in the state where the tumble control valve is fully open.

The opening of the tumble control valve 15 is controlled by the ECU 7. In the operation state where a tumble flow is required (when the engine 1 is cold or in the low to middle speed range, for example), the valve element 15a is controlled to the position shown in FIG. 1 (half-open position). When the engine 1 has been warmed up or is in the high speed range, for example, the valve element 15a is controlled to the position shown in FIG. 2 (full-open position).

The operation of the engine 1 including such an intake system is briefly described below.

First, when the intake valve 12 opens and the piston 2 moves downward in the intake stroke of the engine 1, intake air passes through the gap around the intake valve 12 to flow into the combustion chamber 10. At this time, in the case where the engine 1 is in the high speed range or has been warmed up, for example, the valve element 15a of the tumble control valve 15 is controlled to the full-open position shown in FIG. 2. In the state where the tumble control valve 15 is in the full-open position, intake air flows into both the upper flow path 11a and the lower flow path 11b to flow through the gap around the intake valve 12 substantially uniformly. Thus, a relatively week airflow is generated in the combustion chamber 10 to generate only a slight tumble flow.

In contrast, in the case where the engine 1 is in the low to middle speed range or cold, for example, the valve element 15a of the tumble control valve 15 is controlled to the half-open position shown in FIG. 1, so that most of the intake air passes through the upper flow path 11a to flow into the combustion chamber 10. Thus, a strong tumble flow is generated in the combustion chamber 10. Such a tumble flow generated agitates in the cylinder to promote evaporation and atomization of fuel, achieving excellent fuel property of fuel in the combustion chamber 10 in the expansion stroke.

A description is now made of the construction of the piston 2. The piston 2 in accordance with this embodiment is formed by casting an aluminum alloy. As shown in FIG. 1, the small end of the connecting rod 8 is coupled to a piston pin 2d. A piston pin hole 2e through which the piston pin 2d is inserted is formed in the outer peripheral part of the piston 2. The axis of the piston pin hole 2e is substantially perpendicular to the axis of the piston 2. Piston rings 2a, 2b, 2c are respectively mounted in a plurality of (in this embodiment, three) ring grooves formed in the outer peripheral surface of the piston 2.

The shape of the piston top surface is specifically described below.

Figure 3:
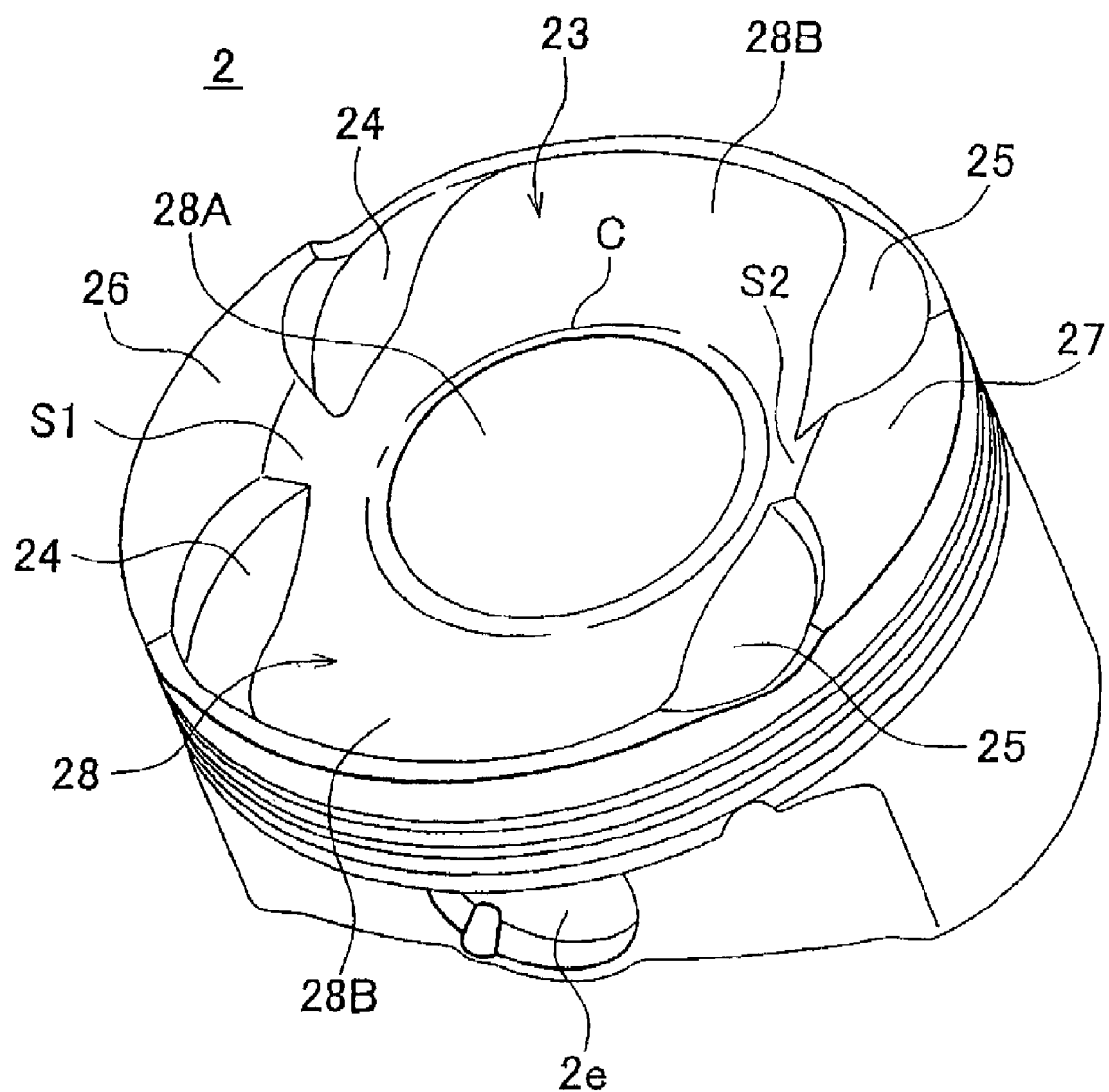
FIG. 3 is a perspective view of a piston.
Figure 4:
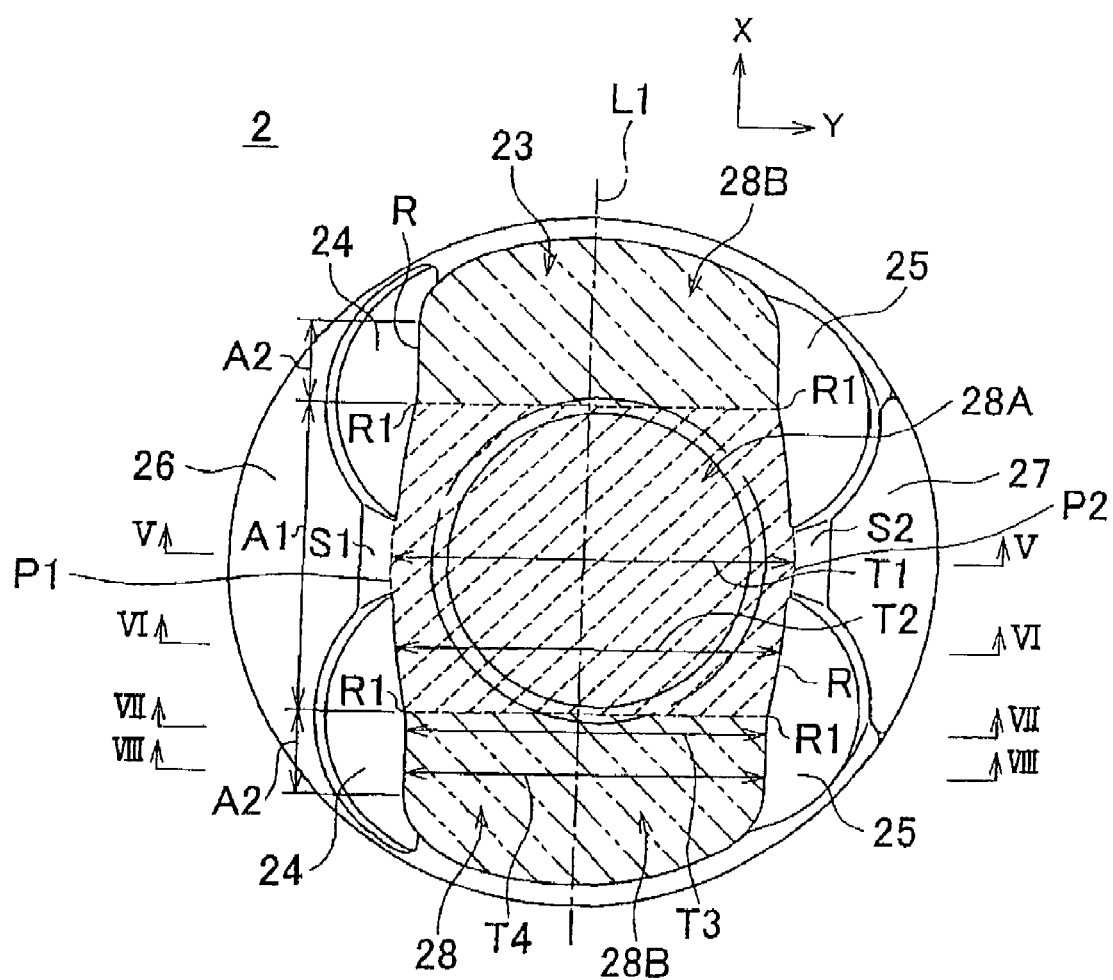
FIG. 4 is a plan view of the piston.

FIG. 3 is a perspective view of the piston 2 in accordance with this embodiment. FIG. 4 is a plan view of the piston 2. In the description below, for simplicity of description, the direction along the axis L1 (see FIG. 4) of the piston pin hole 2e (see FIG. 3) as the piston 2 is viewed in plan (FIG. 4) is referred to as "X direction," and the horizontal direction perpendicular to the axis L1 of the piston pin hole 2e is referred to as "Y direction." In addition, the direction along the axis of the piston 2 (vertical direction) is referred to as "Z direction."

As shown in FIGS. 3 and 4, the top surface 23 of the piston 2 in accordance with this embodiment includes intake-side valve recesses 24, 24 formed at positions corresponding to the respective intake valves 12, 12, exhaust-side valve recesses 25, 25 formed at positions corresponding to the respective exhaust valves 22, 22, an intake-side squish area 26 formed on the outer side of the intake-side valve recesses 24, 24, an exhaust-side squish area 27 formed on the outer side of the exhaust-side valve recess 25, 25, and a tumble flow maintaining depression 28 formed to be depressed at the center of the piston top surface 23. That is, the two intake-side valve recesses 24, 24 are disposed adjacent to each other (or aligned along) in the X direction. Also, the two exhaust-side valve recesses 25, 25 are disposed adjacent to each other (or aligned along) in the X direction. The longitudinal direction of the tumble flow maintaining depression 28 extends in X direction, and coincides with the axis L1.

The intake-side valve recesses 24, 24 are formed to prevent the respective intake valves 12, 12 from interfering with the piston top surface 23 when the intake valves 12, 12 are lifted. Since the axis of each intake valve 12 is inclined with respect to the axis of the piston 2 (Z axis), the valve-facing surface of each intake-side valve recess 24 is inclined in the direction generally perpendicular to the axis of the intake valve 12.

Also, the exhaust-side valve recesses 25, 25 are formed to prevent the respective exhaust valves 22, 22 from interfering with the piston top surface 23 when the exhaust valves 22, 22 are lifted. Since the axis of each exhaust valve 22 is inclined with respect to the axis of the piston 2 (Z axis), the valve-facing surface of each exhaust-side valve recess 25 is inclined in the direction generally perpendicular to the axis of the exhaust valve 22.

As described above, the tumble flow maintaining depression 28 is formed in the piston top surface 23. Since the valves do not interfere with the region where the tumble flow maintaining depression 28 is formed, the intake-side valve recesses 24, 24 and the exhaust-side valve recesses 25, 25 are formed on the outer side of and are adjacent to the tumble flow maintaining depression 28. While the valve-facing surfaces of the respective valve recesses 24, 24, 25, 25 are inclined upward toward the center of the piston, the inner surface of the tumble flow maintaining depression 28 is inclined upward toward the outer side of the piston. Thus, the edge line R of a predetermined shape is defined between the intake-side valve recesses 24, 24 and the tumble flow maintaining depression 28, and between the exhaust-side valve recesses 25, 25 and the tumble flow maintaining depression 28. The shape of the edge line R will be described later.

The intake-side squish area 26 is formed on the outer side of the intake-side valve recesses 24, 24, and inclined upward (upward in the Z direction) toward the center of the piston 2. The intake-side squish area 26 has a function of generating an airflow toward the center of the combustion chamber 10 (squish flow) by narrowing the space between the intake-side squish area 26 and the cylinder head 1b in the compression stroke of the engine 1.

The exhaust-side squish area 27 is formed on the outer side of the exhaust-side valve recesses 25, 25, and inclined upward (upward in the Z direction) toward the center of the piston 2. As with the intake-side squish area 26, the exhaust-side squish area 27 has a function of generating an airflow toward the center of the combustion chamber 10 (squish flow) by narrowing the space between the exhaust-side squish area 27 and the cylinder head 1b in the compression stroke of the engine 1.

The tumble flow maintaining depression 28 of the piston 2 is formed at the center of the piston top surface. A detailed description follows.

Figure 5:
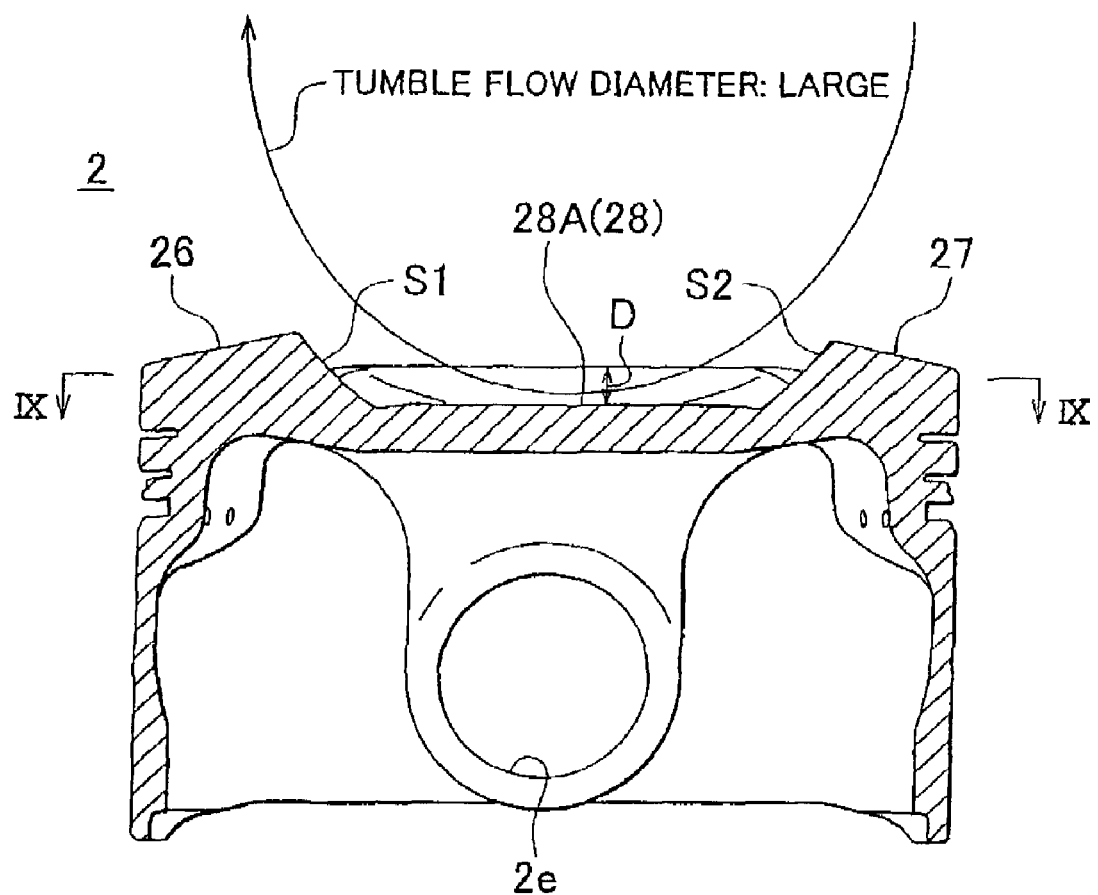
FIG. 5 is a sectional view taken along the line V-V in FIG. 4.
Figure 6:
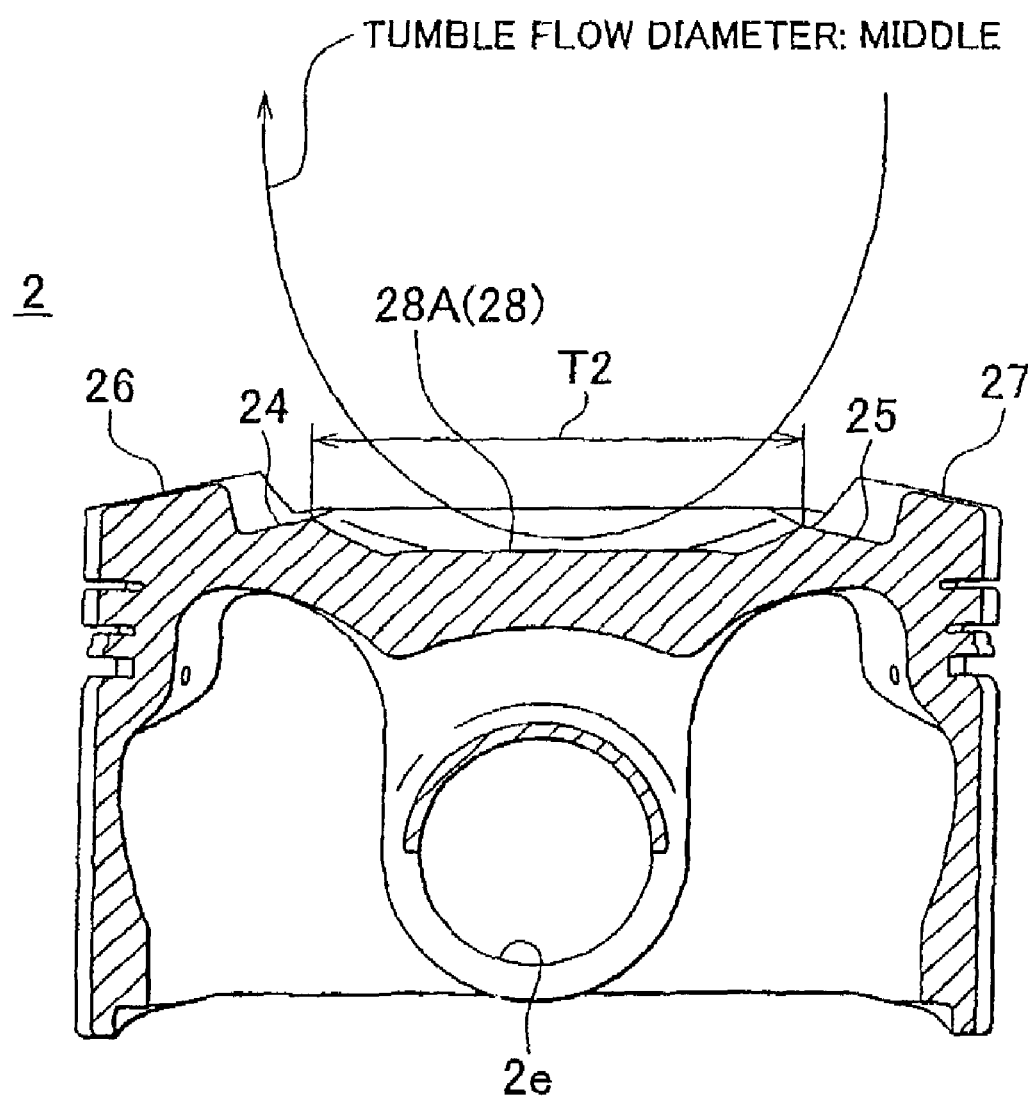
FIG. 6 is a sectional view taken along the line VI-VI in FIG. 4.
Figure 7:
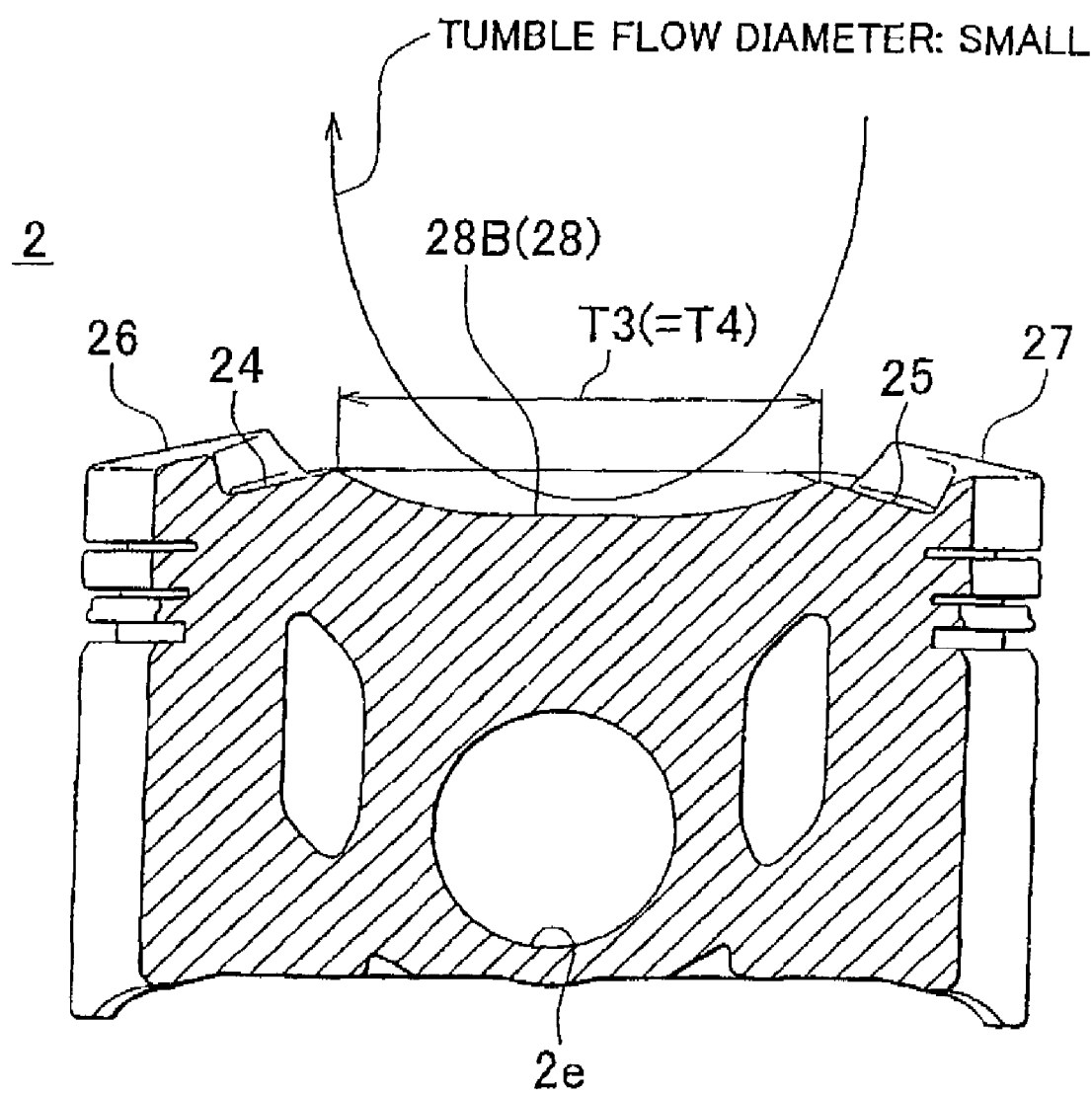
FIG. 7 is a sectional view taken along the line VII-VII in FIG. 4.
Figure 8:
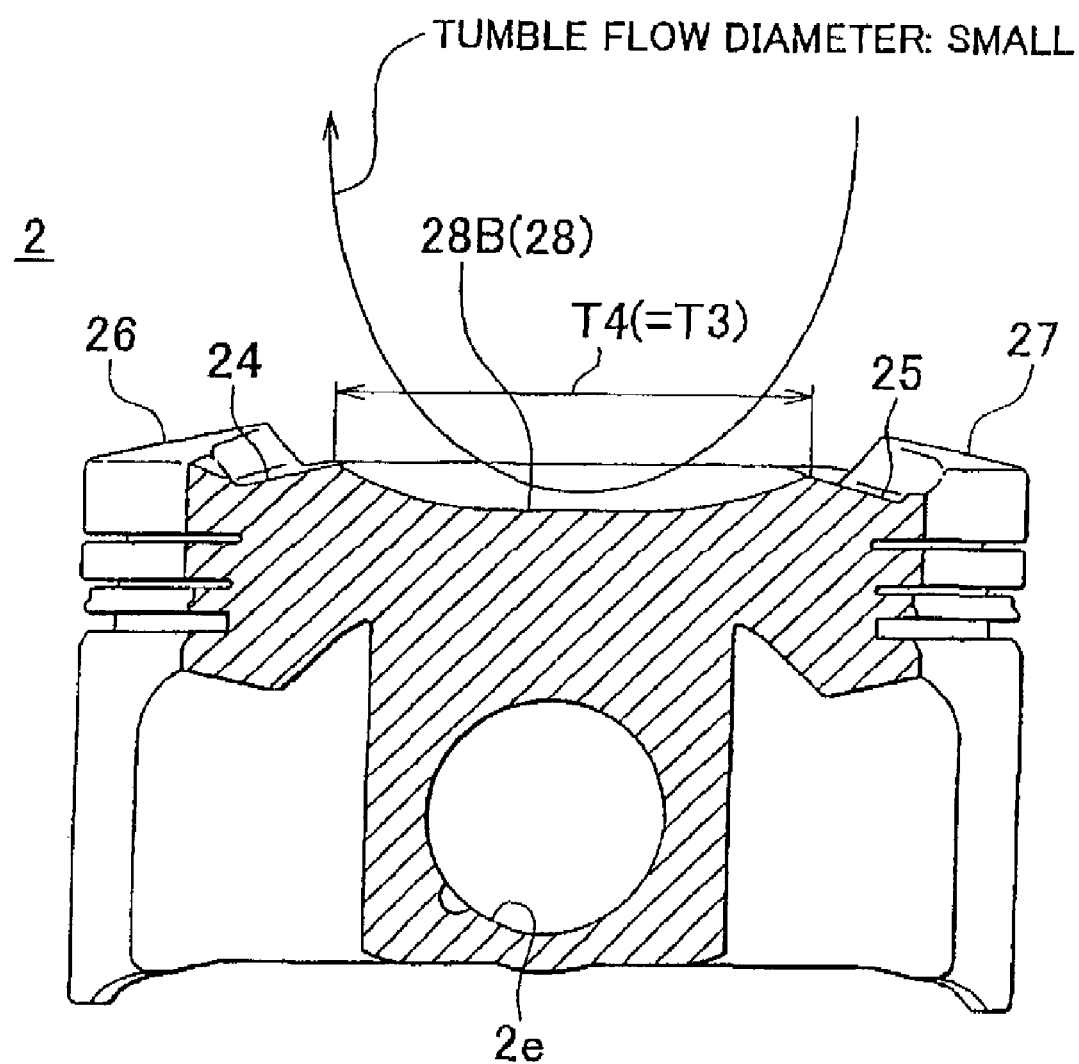
FIG. 8 is a sectional view taken along the line VIII-VIII in FIG. 4.
Figure 9:
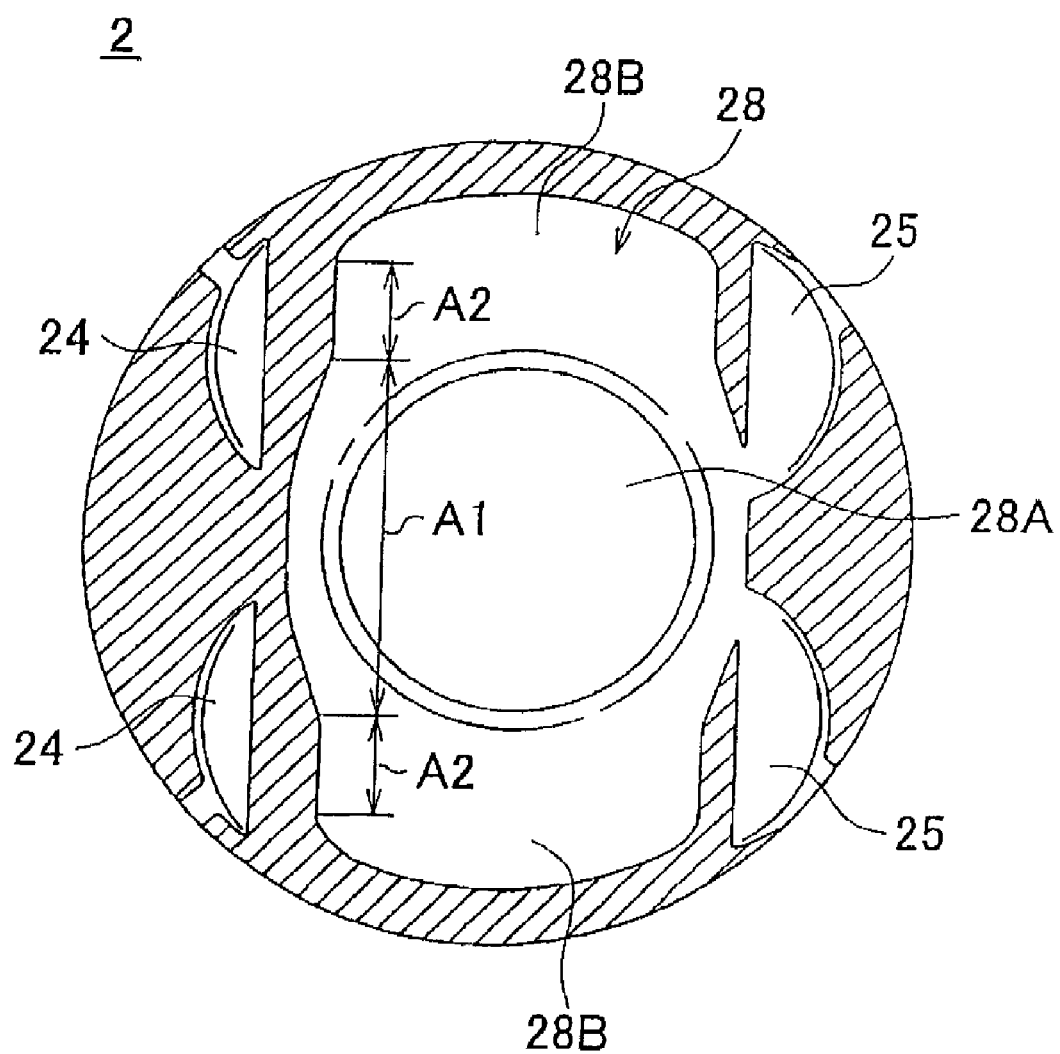
FIG. 9 is a sectional view of the piston at the position corresponding to the line IX-IX in FIG. 5.

FIG. 5 is a sectional view taken along the line V-V in FIG. 4. FIG. 6 is a sectional view taken along the line VI-VI in FIG. 4. FIG. 7 is a sectional view taken along the line VII-VII in FIG. 4. FIG. 8 is a sectional view taken along the line VIII-VIII in FIG. 4. FIG. 9 is a sectional view of the piston 2 at the position corresponding to the line IX-IX in FIG. 5.

As shown in these drawings, the tumble flow maintaining depression 28 is formed to extend across between both vicinities of the outer peripheries of the piston 2 in the direction along the axis L1 of the piston pin hole 2e (X direction) through which the piston pin 2d is inserted, and to extend across between the region where the intake-side valve recesses 24, 24 are formed and the region where the exhaust-side valve recesses 25, 25 are formed in the direction perpendicular to the axis L1 of the piston pin hole 2e (Y direction). The depth at the deepest part of the tumble flow maintaining depression 28 (the depth with respect to the outer periphery of the piston top surface 23; the dimension D in FIG. 5) is set to be about 5% of the outside diameter of the piston 2. Note that this figure is not limited thereto.

The tumble flow maintaining depression 28 includes a center tumble flow guiding region (center region) 28A formed at the center in the X direction, and side regions 28B, 28B continuously formed on both sides of the center region 28A (adjacently on both sides in the X direction). In FIG. 4, the center region 28A is hatched with broken lines, while the side regions 28B, 28B are hatched with chain double-dashed lines.

The center region 28A has a reduction part (indicated as A1 in FIG. 4) in which the depression width (the dimension in the Y direction) is largest (the dimension T1 in FIG. 4) at the center of the piston top surface in the X direction, and in which the depression width (the dimension in the Y direction) is gradually reduced toward the piston outer periphery in the X direction. For example, the depression width at the part along the VI-VI line in FIG. 4 (the dimension in the Y direction, or the dimension T2 in FIG. 4; see the sectional view of FIG. 6) is smaller than the width at the center (T1). As described above, the depression width is gradually reduced toward the piston outer periphery in the X direction in the reduction part A1. The edge line R in the reduction part A1 can be considered as the "changing edge line" of the present invention. Specifically, the dimension T1 is set to about 60% of the outside diameter of the piston 2, and the dimension T2 is set to about 55% of the outside diameter of the piston 2. Also, the length of the reduction part A1 is set to about 45% of the outside diameter of the piston 2. Note that these figures are not limited thereto. In FIG. 4, the range (an intermediate position) between the two intake-side valve recesses is shown by the dotted line P1, while the range (an intermediate position) between the two exhaust-side valve recesses is shown by the dotted line P2. The dimension of the depression in the Y direction is largest in the region defined by the dotted lines P1 and P2 and the lines connecting the respective opposing ends of P1 and P2 with each other, that is, the region between P1 and P2 opposing each other.

The intake-side squish area 26 and the exhaust-side squish area 27 preferably have as large an area as possible. On the other hand, the depression width (the dimension in the Y direction) is set to be large at the center in the X direction, as described above. Thus, in the region between the intake-side valve recesses 24, 24, the inclination angle of the inclined surface S1 extending from the outer periphery of the center region 28A to the intake-side squish area 26 is set to be larger (for example, 50° with respect to the horizontal direction) than that of a typical conventional piston. Likewise, in the region between the exhaust-side valve recesses 25, 25, the inclination angle of the inclined surface S2 extending from the outer periphery of the center region 28A to the exhaust-side squish area 27 is set to be larger (for example, 50° with respect to the horizontal direction) than that of a typical conventional piston.

The edge line R in the reduction part A1 is arcuate with a constant curvature. The edge line R is not limited thereto, and may be curved with a gradually changing curvature or generally straight.

On the other hand, the side regions 28B, 28B have a constant part (indicated as A2 in FIG. 4) of which outer edges extend generally in parallel to the X direction. Thus, the depression width at the part along the VII-VII line in FIG. 4 (the dimension in the Y direction, or the dimension T3 in FIG. 4; see the sectional view of FIG. 7) is generally equal to the depression width at the part along the VIII-VIII line in FIG. 4 (the dimension in the Y direction, or the dimension T4 in FIG. 4; see the sectional view of FIG. 8), for example. As described above, the depression width in the Y direction is generally uniform in the constant part A2. The edge line R in the constant part A2 can be considered as the "constant edge line" of the present invention. Specifically, the dimensions T3 and T4 are set to about 50% of the outside diameter of the piston 2. Also, the length of each constant part A2 is set to about 13% of the outside diameter of the piston 2. Note that these figures are not limited thereto.

An inflection part R1 is provided at the boundary between the reduction part A1 and the constant parts A2, A2, where the curvature of the edge line R changes between that of the reduction part A1 and that of the constant parts A2, A2. The inflection part R1 smoothly connects the edge line R of the reduction part A2 and the edge line R of the constant part A2. Thus, the part of the tumble flow maintaining depression 28 on the center side with respect to the inflection part R1 is defined as the center region 28A, while the part of the tumble flow maintaining depression 28 on the outer side (in the X direction) with respect to the inflection part RI is defined as the side regions 28B, 28B. The inflection part R1 exists on each edge line between the intake-side valve recesses 24, 24 and the tumble flow maintaining depression 28, and on each edge line between the exhaust-side valve recesses 25, 25 and the tumble flow maintaining depression 28. That is, the inflection part R1 exists at four positions on the piston top surface 23.

The symbol C in FIG. 3 indicates the outer peripheral shape of the part to be pushed in casting the piston 2, the inner region of which (which occupies a most part of the center region 28A) is generally flat. The robustness of the piston 2 is increased by positioning the part to be pushed in the center region 28A which is relatively large.

A description is now made of how a tumble flow is generated. Since the tumble flow maintaining depression 28 includes the center region 28A and the side regions 28B, 28B as described above, intake air flowing into the cylinder when the engine 1 is driven generates a tumble flow including a center tumble flow flowing along the center region 28A and a side tumble flow flowing along the side regions 28B, 28B.

At the center of the center region 28A in the X dimension, the depression width (the dimension in the Y direction) is secured to be relatively large, so that a center tumble flow having a large diameter and a flow line extending in the Y direction is generated (see the tumble flow shown in FIG. 5). In addition, in the reduction part A1 of the center region 28A, the depression width (the dimension in the Y direction) is gradually reduced toward the outer side in the X direction, so that the diameter of the tumble flow becomes gradually smaller toward the piston outer periphery. That is, the diameter of the tumble flow becomes gradually smaller as the in-cylinder length in the Y direction becomes gradually smaller toward the piston outer periphery so as to generate an ideal center tumble flow (that is not influenced by the cylinder bore inner wall) with its flow line extending in the Y direction and not disturbed (see the tumble flow shown in FIG. 6).

On the other hand, since the side regions 28B, 28B have the constant parts A2, A2 extending in the X direction, the diameter of the side tumble flow which flows in the side regions 28B, 28B does not become smaller toward the piston outer periphery, but is generally uniform over the entire side regions 28B, 28B. That is, a side tumble flow with a generally uniform outside diameter smaller than that of the center tumble flow is generated in the side regions 28B, 28B (see the tumble flow shown in FIGS. 7 and 8). Thus, the side tumble flow is hardly influenced by the cylinder bore inner wall adjacent in the X direction, and has a flow line extending in the Y direction. In addition, since there is almost no influence of the cylinder bore inner wall as described above, a tumble flow is generated in the vicinity of the outer periphery of the piston top surface 23, which excellently agitates in both outer sides of the cylinder in the axial direction of the tumble flow (X direction) to consequently promote evaporation and atomization of fuel in the entire cylinder.

As described above, according to the piston 2 in accordance with this embodiment, it is possible to utilize most of the fluid energy given to intake air to generate a tumble flow which flows along the Y direction, and to promote evaporation and atomization of fuel in the entire cylinder. As a result, the combustion efficiency of fuel in the combustion chamber 10 can be increased, and the exhaust emission and the fuel consumption rate can be improved.

In addition, since the total capacity of the tumble flow maintaining depression 28 is restricted by the reduction part A1 in the center region 28A narrowing the width of the tumble flow maintaining depression 28, the compression ratio of the combustion chamber 10 can be increased. Thus, it is possible to easily realize the engine 1 with a compression ratio exceeding 10, for example, while maintaining the effect described above (to increase the combustion efficiency to improve the exhaust emission and the fuel consumption rate).

Figure 12:
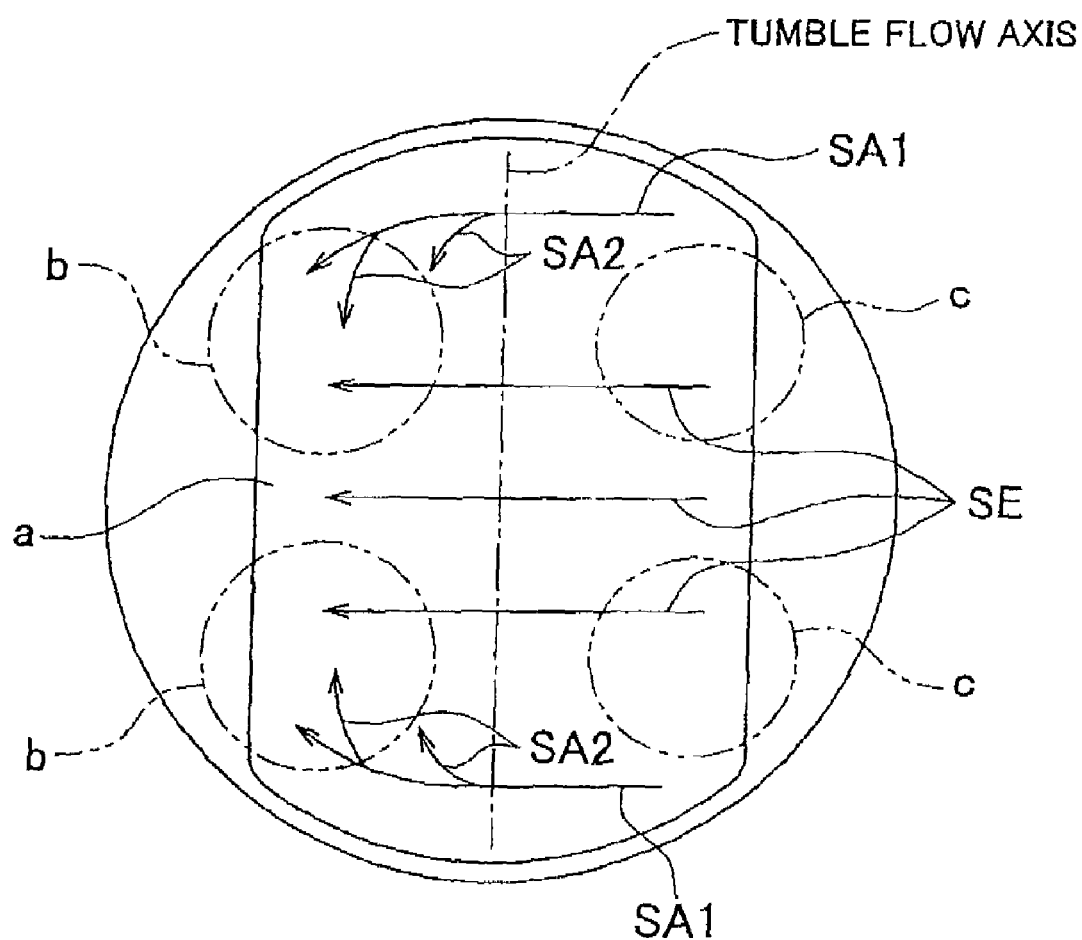
FIG. 12 is a plan view of a piston top surface having a depression of a typical conventional shape.
Figure 13:
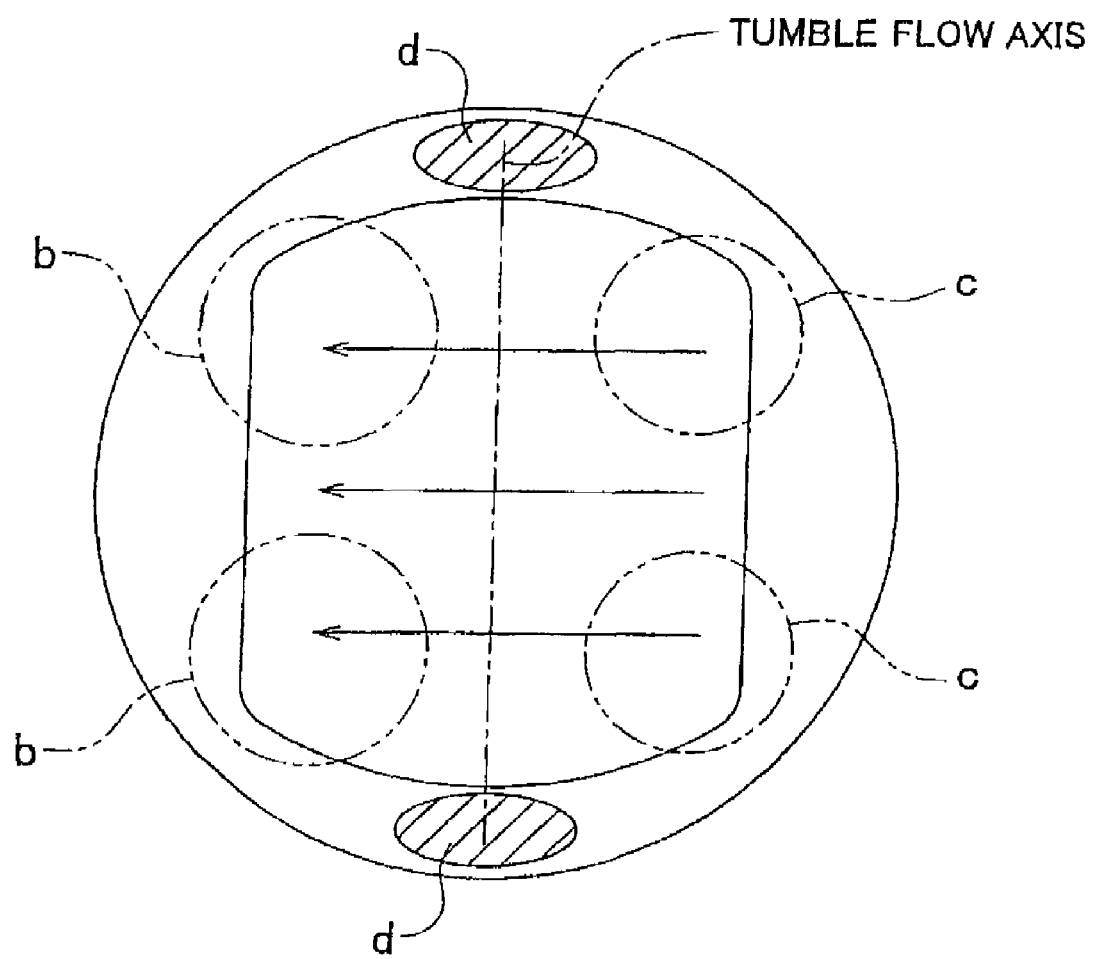
FIG. 13 is a plan view of a piston top surface having a small depression.

A description is now made of an experiment conducted to confirm the effect of the embodiment described above and the results of the experiment. In this experiment, a piston with a top surface having a depression of a conventional shape (such as shown in FIG. 12) and the piston 2 in accordance with the above embodiment are each assembled into an engine (inline four-cylinder gasoline engine) to compare the retardation limit (the limit retardation amount at which the engine stalls) by gradually retarding the ignition timing of the ignition plug 3 (Experiment 1). Also, the lean limit (the limit air-fuel ratio at which the engine stalls) is compared by making the air-fuel ratio gradually leaner (Experiment 2).

Figure 10A:
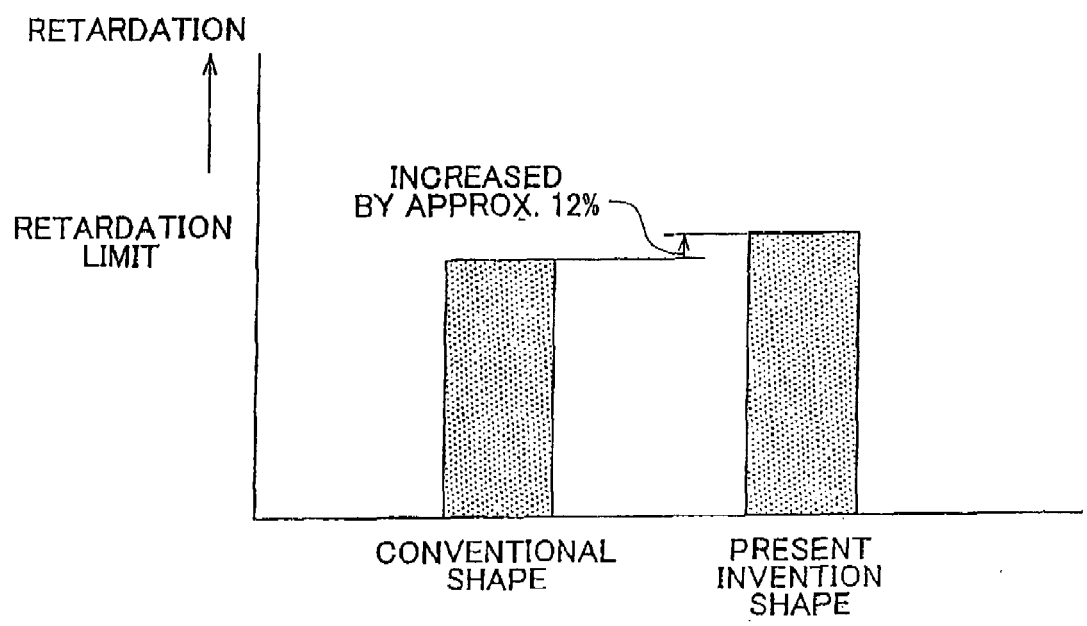
FIG. 10A shows the results of an experiment conducted to confirm the retardation limit.
Figure 10B:
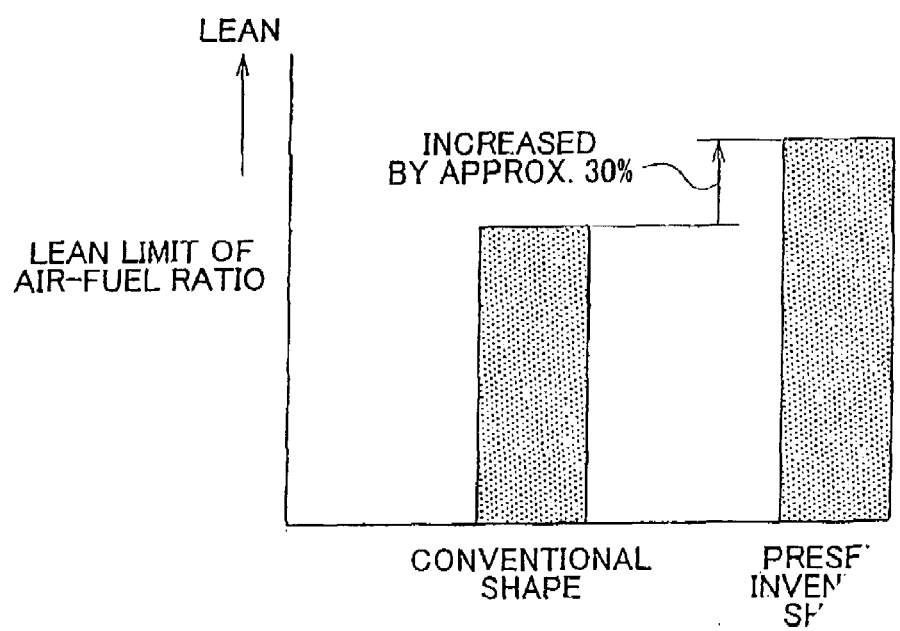
FIG. 10B shows the results of an experiment conducted to confirm the lean limit of the air-fuel ratio.

The results of Experiment 1 are shown in FIG. 10A, and the results of Experiment 2 are shown in FIG. 10B.

As shown in FIG. 10A, the piston 2 with the top surface 23 having the depression 28 of the shape in accordance with the present invention achieved a retardation limit of approximately 12% higher than that achieved by the piston with a top surface having a depression of a conventional shape. That is, it was confirmed that in the case where the piston 2 in accordance with the present invention was used, the ignition timing could be retarded significantly more than the case where the conventional piston was used without stalling the engine, so that a catalytic converter could be activated (heated) quickly by increasing the ignition retardation amount in particular when starting the engine 1 while it is cold.

Also, as shown in FIG. 10B, the piston 2 with the top surface 23 having the depression 28 of the shape in accordance with the present invention achieved a lean limit of the air-fuel ratio of approximately 30% higher than that achieved by the piston with a top surface having a depression of a conventional shape. That is, it was confirmed that in the case where the piston 2 in accordance with the present invention was used, the air-fuel ratio could be made significantly leaner than the case where the conventional piston was used without stalling the engine, so that the fuel consumption rate was significantly improved.

Figure 11A:
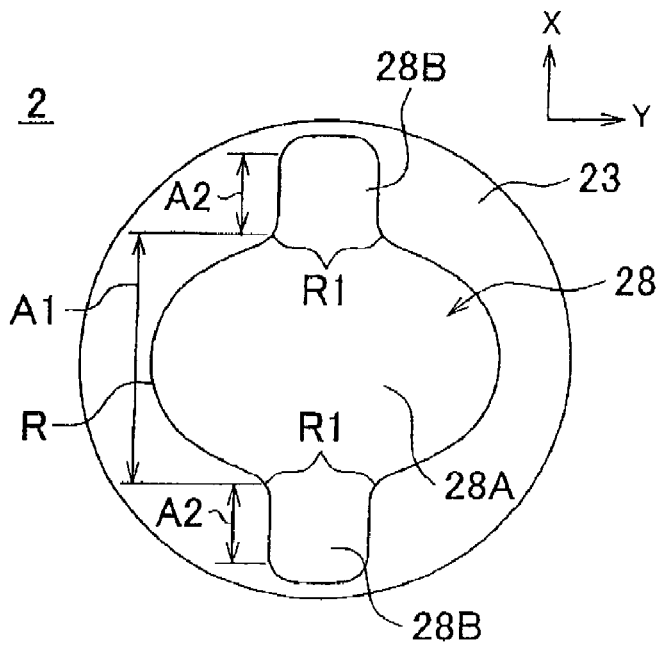
FIGS. 11A and 11B are each a plan view of a piston top surface in accordance with a modification of a tumble flow maintaining depression.
Figure 11B:
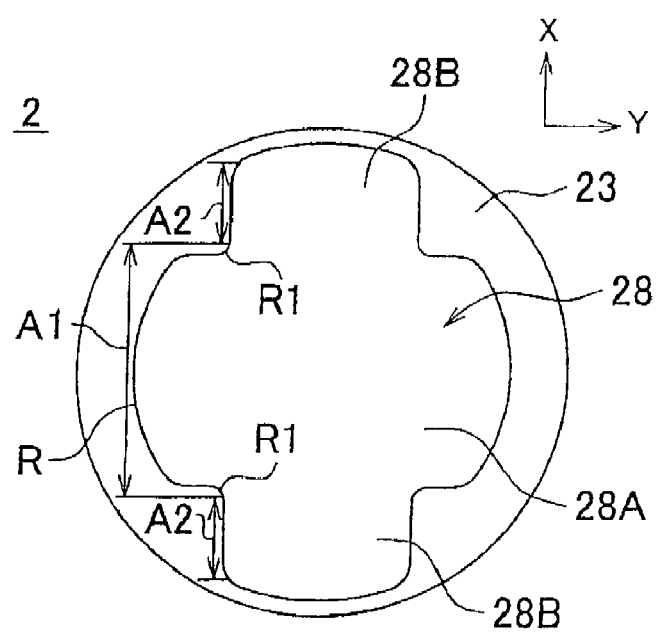

A description is now made of modifications of the tumble flow maintaining depression 28. FIGS. 11A and 11B are each a plan view of the piston top surface 23 showing a modification of the tumble flow maintaining depression 28 (in which valve recesses are not shown).

In the modification shown in FIG. 11A, the edge line R in the center region 28A is changed such that the curvature radius increases toward the piston outer periphery in the X direction, and the depression width in the Y direction in the side regions 28B, 28B is set to be smaller than that in the above embodiment.

Also, in the modification shown in FIG. 11B, the extending direction of the edge line R, which defines the outer periphery of the tumble flow maintaining depression 28, changes by approximately 90° in the inflection part R1 at the boundary between the reduction part A1 and the constant parts A2, A2.

In the embodiment and the modifications described above, the present invention is applied to a piston for use in multi-cylinder gasoline engines for automobiles. The present invention is not limited thereto, and may be applied to diesel engines for automobiles. The present invention may also be applied to engines for other than automobiles. The specification of the engine, such as the number of cylinders and whether or not the engine has a tumble control valve 15, is not specifically limited.

The invention claimed is:

1. A piston for an internal combustion engine, comprising:
a top surface having a valve recess for avoiding interference with a valve and a tumble flow maintaining depression,
wherein a region where the valve recess is formed and a region where the depression is formed are adjacent to each other, and an edge line defined between the region where the valve recess is formed and the region where the depression is formed includes a changing edge line along which a dimension of the depression in a width direction perpendicular to a tumble flow axis becomes smaller from a center in a direction along the tumble flow axis toward a piston outer periphery in the direction along the tumble flow axis, a constant edge line along which the dimension of the depression in the width direction is maintained to be generally constant toward the piston outer periphery in the direction along the tumble flow axis, and an inflection part connecting the changing edge line and the constant edge line.

2. The piston according to claim 1,
wherein the valve recess comprises two intake-side valve recesses provided adjacent to each other and two exhaust-side valve recesses provided adjacent to each other; and
the dimension of the depression in the width direction is set to be largest in a region between an intermediate position between the intake-side valve recesses and an intermediate position between the exhaust-side valve recesses.

3. The piston according to claim 1, further comprising:
an outer peripheral part having a piston pin hole through which a piston pin is to be inserted,
wherein an axis of the piston pin hole is substantially parallel to the tumble flow axis.

4. The piston according to claim 3,
wherein the dimension of the depression in the width direction is largest substantially at the center of the top surface in the direction along the axis of the piston pin hole.

5. The piston according to claim 1,
wherein the dimension of the depression in the width direction is largest substantially at the center of the top surface in the direction along the tumble flow axis.

6. An internal combustion engine comprising:
a cylinder having a cylinder bore; and
the piston according to claim 1 disposed in the cylinder bore, wherein the piston reciprocates in the cylinder bore to generate power as an air-fuel mixture is combusted in a combustion chamber.

7. A piston for an internal combustion engine, comprising:
a top surface having a valve recess for avoiding interference with a valve and a tumble flow maintaining depression; and
an outer peripheral part having a piston pin hole through which a piston pin is to be inserted,
wherein a region where the valve recess is formed and a region where the depression is formed are adjacent to each other, and an edge line defined between the region where the valve recess is formed and the region where the depression is formed includes a changing edge line along which a dimension of the depression in a width direction perpendicular to an axis of the piston pin hole becomes smaller from a center in a direction along the axis of the piston pin hole toward a piston outer periphery in the direction along the axis of the piston pin hole, a constant edge line along which the dimension of the depression in the width direction is maintained to be generally constant toward the piston outer periphery in the direction along the axis of the piston pin hole, and an inflection part connecting the changing edge line and the constant edge line.

8. The piston according to claim 7,
wherein the valve recess includes two intake-side valve recesses provided adjacent to each other and two exhaust-side valve recesses provided adjacent to each other; and
the dimension of the depression in the width direction is set to be largest in a region between an intermediate position between the intake-side valve recesses and an intermediate position between the exhaust-side valve recesses.

9. The piston according to claim 7,
wherein the dimension of the depression in the width direction is largest substantially at the center of the top surface in the direction along the axis of the piston pin hole.

10. An internal combustion engine comprising;
a cylinder having a cylinder bore; and
the piston according to claim 7 disposed in the cylinder bore,
wherein the piston reciprocates in the cylinder bore to generate power as an air-fuel mixture is combusted in a combustion chamber.

11. A piston for an internal combustion engine, comprising a top surface having a tumble flow maintaining depression,
wherein the depression includes a center region formed at a center in a longitudinal direction of the depression and a side region continuously formed on both outer sides of the center region in the longitudinal direction,
the center region has a reduction part in which a dimension of the center region in a width direction perpendicular to the longitudinal direction is gradually reduced toward a piston outer periphery in the longitudinal direction,
the side region has a constant part in which a dimension of the side region in the width direction is substantially uniform in the longitudinal direction, and
wherein the top surface further includes a valve recess adjacent to the depression, and an edge line defined between the valve recess and the depression includes a changing edge line along which a dimension of the depression in the width direction becomes smaller from a center in the longitudinal direction toward the piston outer periphery in the longitudinal direction, a constant edge line along which the dimension of the depression in the width direction is maintained to be generally constant toward the piston outer periphery in the longitudinal direction, and an inflection part connecting the changing edge line and the constant edge line.

12. The piston according to claim 11, wherein the valve recess includes two intake-side valve recesses provided adjacent to each other and two exhaust-side valve recesses provided adjacent to each other,
the height between the bottom of the depression and the edge line is shorter than the height between the bottom of the depression and a ridge that is formed between the depression and a squish area formed on the outer side of the depression, and is formed between the two intake-side recesses in the longitudinal direction.

13. The piston according to claim 11, wherein the valve recess includes two intake-side valve recesses provided adjacent to each other and two exhaust-side valve recesses provided adjacent to each other,
the height between the bottom of the depression and the edge line is shorter than the height between the bottom of the depression, and a ridge that is formed between the depression and a squish area formed on the outer side of the depression, and is formed between the two exhaust-side recesses in the longitudinal direction.

14. The piston according to claim 13, wherein the longitudinal direction of the depression substantially corresponds to a tumble flow axis.

15. The piston according to claim 13, further comprising an outer peripheral part having a piston pin hole through which a piston pin is to be inserted,
wherein the longitudinal direction of the depression substantially corresponds to an axis of the piston pin hole.

* * * * *